United States Patent [19]

Sasaki

[11] Patent Number: 4,816,843
[45] Date of Patent: Mar. 28, 1989

[54] METHOD OF CONTROLLING A THERMAL HEAD

[75] Inventor: Eiichi Sasaki, Sagamihara, Japan

[73] Assignee: Ricoh Company, Ltd., Tokyo, Japan

[21] Appl. No.: 55,899

[22] Filed: May 29, 1987

[30] Foreign Application Priority Data

Jun. 4, 1986 [JP] Japan ................................. 61-129849
Jun. 18, 1986 [JP] Japan ................................. 61-142485

[51] Int. Cl.⁴ ............................................. G01D 15/10
[52] U.S. Cl. .................................. 346/76 PH; 400/120
[58] Field of Search ......................... 219/216, 216 PH; 346/76 PH, 76 R; 364/518, 519; 400/120, 120 PH

[56] References Cited

U.S. PATENT DOCUMENTS

| | | | |
|---|---|---|---|
| 4,567,488 | 1/1986 | Moriguchi et al. | 346/76 PH |
| 4,675,697 | 1/1987 | Sasaki et al. | 346/76 PH |
| 4,688,051 | 8/1987 | Kawakami et al. | 364/519 |

FOREIGN PATENT DOCUMENTS

0025859 2/1986 Japan ........................... 346/76 PH

Primary Examiner—E. A. Goldberg
Assistant Examiner—Huan H. Tran
Attorney, Agent, or Firm—Cooper & Dunham

[57] ABSTRACT

A thermal head controlling method applicable to a thermal printer, a facsimile and other thermal recording apparatus selectively energizes heating elements of a thermal head in response to graphic and text data which are fed from a host machine, thereby printing out the data. The energy applied to the heating elements is selected to be greater when text data are to be printed than when graphic data are to be printed. The thermal head is driven by producing, for a pixel being observed, correction data for odd dots and correction data for even dots while referencing data positioned predetermined numbers of dot lines before the pixel observed, data predetermined numbers of dot lines after the pixel observed, and data positioned predetermined numbers of dots next to the pixel observed.

4 Claims, 7 Drawing Sheets

HDATA1  No.0

HDATA2  No.320

HDATA3  No.640

HDATA4  No.860

HDATA5  No.1280

HDATA6  No.1600

HDATA7  No.1920

HDATA8  No.2240

| $D_3$ $D_2$ $D_1$ $D_0$ ($D_7$ $D_6$ $D_5$ $D_4$) | PULSE TRAIN 1 2 3 4 5 6 7 8 9 10 11 12 13 14 15 |
|---|---|
| 0 0 0 1 | 1 0 0 0 0 0 0 0 0 0 0 0 0 0 0 |
| ⋮ | ⋮ |
| 1 1 1 1 | 1 1 1 1 1 1 1 1 1 1 1 1 1 1 1 |

FIG. 10

METHOD OF CONTROLLING A THERMAL HEAD

BACKGROUND OF THE INVENTION

The present invention relates to a method of controlling a thermal head which is installed in a thermal printer, a facsimile apparatus, and other thermal recording apparatus.

Many printers and other recording apparatus, use a thermal print head to reduce low noise and to bring about other desirable features of a non-impact system. A thermal head generally comprises a great number of heating elements which are arranged in an array at a predetermined pitch. Energy is selectively applied to the heating elements in response to a print signal to heat a heat-sensitive sheet or an ink sheet, whereby dots are printed out on the sheet to record characters and other images.

Some modern thermal printing apparatus are provided with an implementation for the correction of energy to be applied in order to enhance quality printing. This stems from the fact that when a certain heating element is to be energized, applying the same energy to the heating element neglecting the history of the preceding line, that of surrounding heating elements, and other heat accumulation conditions of surrounding dots results in irregular print density. The energy or heat correction may be accomplished by setting up drive conditions on the basis of data on surrounding dots and by use of a line buffer, as disclosed in Japanese Patent Laid-Open Publication No. 58-146176 or the like.

Data to be printed out are generally classified into two kinds, i.e., graphic data such as pictures, and text data such as characters which are stored in a character generator. It is a common practice to selectively energize heating elements of a thermal head based on graphic and text data which are fed from a host machine to the thermal head. Hence, it often occurs that print data from a host machine include both of graphic and text data at a time. Even when graphic and text data coexist with each other as stated, the control system described in Japanese Patent Laid-Open Publication No. 58-146176 controls all print data under the same condition. Such a control system may be effective so long as the print data are graphic data only. However, when it comes to graphic data which are accompanied by text data, the control system disclosed which is elaborated to print out graphic data by use of dots is apt to cause text data, or line data, read out of a character generator to appear thin and, thereby, degrades the printout quality.

It has been customary to drive heating elements of a thermal head by dividing them into two groups, one corresponding to odd dots and the other to even dots. Nevertheless, a problem arises that the preceding dots cause the following dots to render the areas of the latter irregular.

SUMMARY OF THE INVENTION

It is therefore an object of the present invention to provide a method of controlling a thermal head which enhances quality printing.

It is another object of the present invention to provide a method of controlling a thermal head which is capable of printing out text data with high quality even if the text data coexist with graphic data.

It is another object of the present invention to provide a method of controlling a thermal head which reproduces adequate density and maintains dot area constant.

It is another object of the present invention to provide a generally improved method of controlling a thermal head.

In accordance with the present invention, in a method of controlling a thermal head for selectively energizing heating elements of the thermal head in response to graphic data or text data, which is fed from a host machine, to print out the data, energy to be applied to the heating elements of the thermal head is selected to be greater when the data is text data than when the data is graphic data.

Further, in accordance with the present invention, in a method of controlling a thermal head for energizing odd dots and even dots represented by heating elements of the thermal head alternatively, the thermal head is driven by producing, for a pixel being observed, correction data for odd and correction data for even while referencing data positioned predetermined numbers of dot lines before the pixel being observed, data positioned predetermined numbers of dot lines after the pixel being observed, and data predetermined numbers of dots next to the data being observed.

The above and other objects, features and advantages of the present invention will become more apparent from the following detailed description taken with the accompanying drawings.

DESCRIPTION OF THE PREFERRED EMBODIMENT

Figure 1:
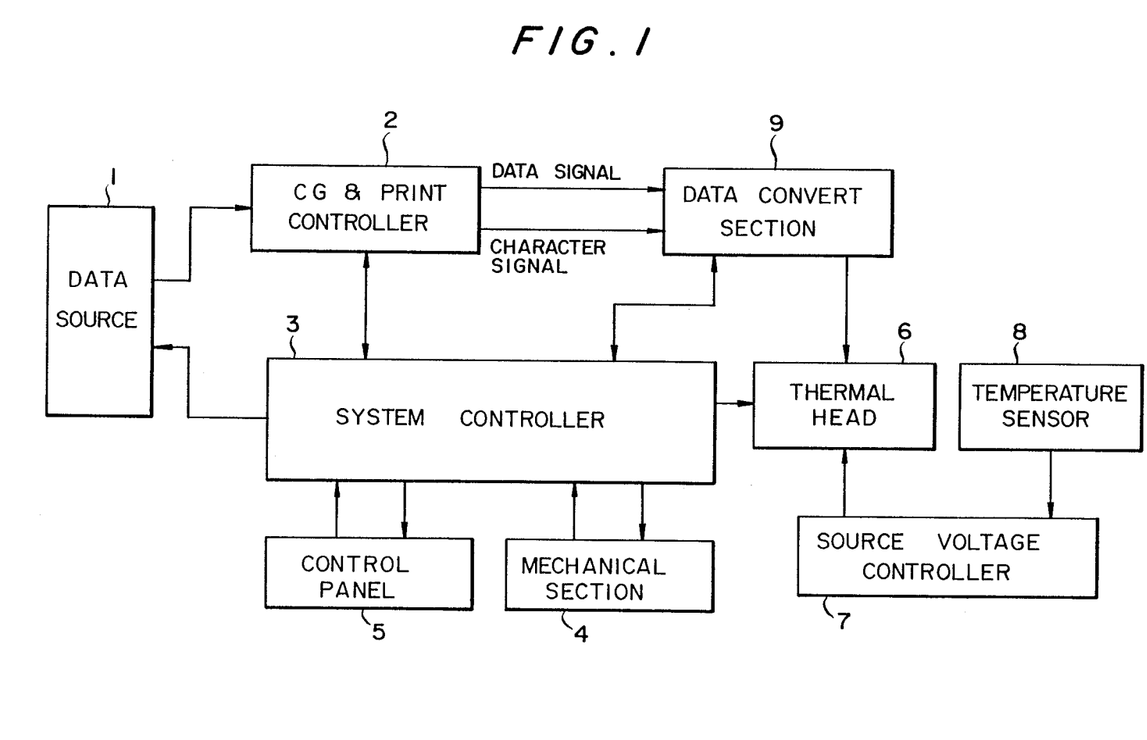
FIG. 1 is a block diagram showing the general construction of a color thermal printer to which a method of the present invention is applied.

Referring to FIG. 1 of the drawings, a color thermal printer to which a thermal printer controlling method of the present invention is applied is shown in a block diagram. In this particular embodiment, the color thermal printer is assumed to use four colors, i.e., yellow (Y), magenta (M), cyan (C) and black (BK) by way of example.

In FIG. 1, the reference numeral 1 designates a data source which corresponds to a host machine and generates graphic and text data as well as print command signals. The data source 1 is connected to a character generator (CG) and printer controller 2 which functions to compile commands output by the data source 1 and to convert text data into graphic data. A system controller 3 having a central processing unit (CPU) is connected to the data source 1, CG and printer controller 2 and others in order to control the general sequence of the entire printer inclusive of a mechanical section 4 and a control panel 5. The mechanical section 4 includes stepping motors, a cutter motor, sensors, etc.

A thermal head 6 is connected to the system controller 3 and constituted by an array of numerous heating elements, not shown, which are arranged at a predetermined pitch. A source voltage controller 7 is connected to the thermal head 6 for the purpose of compensating for irregularity in printout density due to ambient temperature. The source voltage controller 7 is controlled on the basis of ambient temperature which is sensed by a temperature sensor 8. A data converting section 9 is connected to the system controller 3 and between the CG and printer controller 2 and the thermal head 6. The data converting section 9 is adapted to convert graphic data output by the printer controller 2 into a particular format which is suitable for the thermal head 6, by heat correction using nearby dots and heat accumulation.

Figure 2:
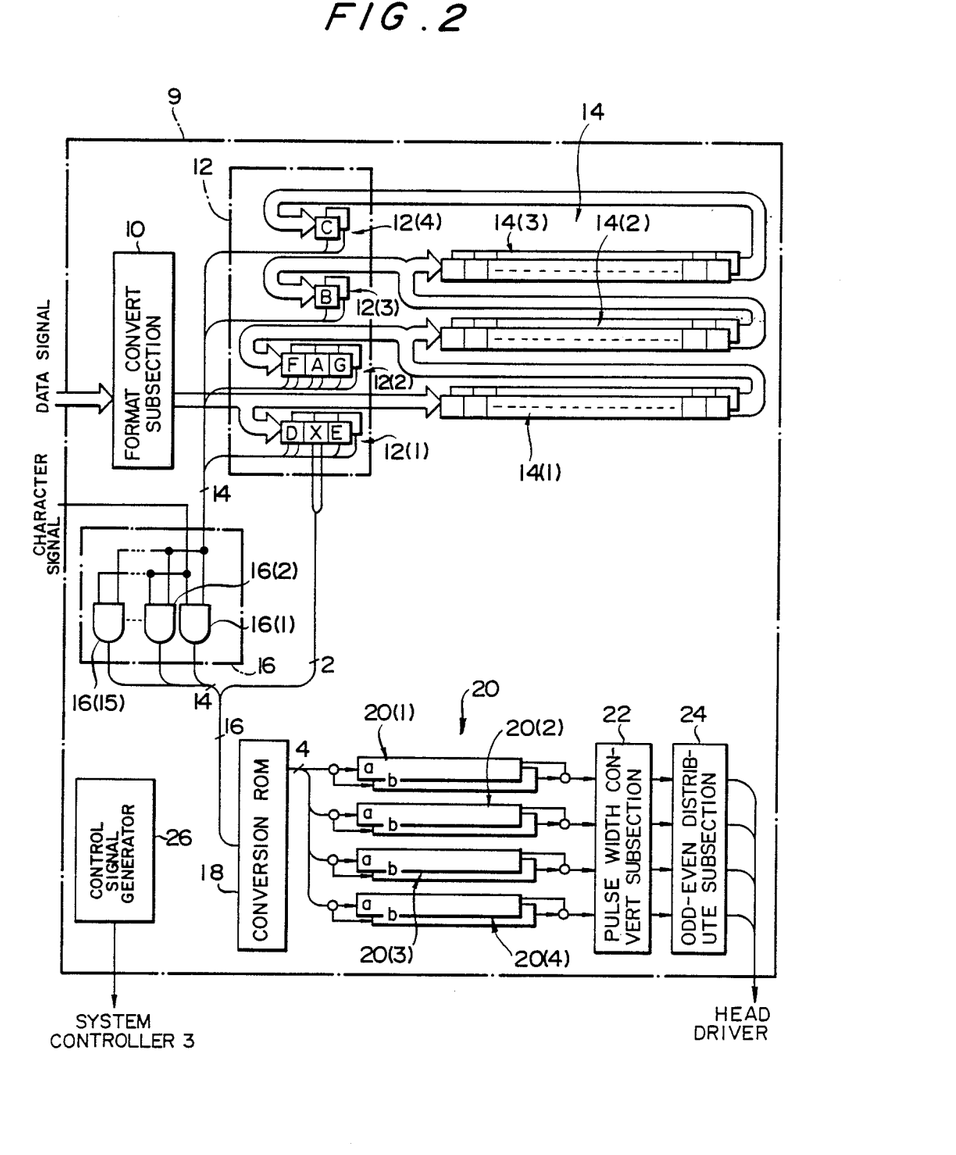
FIG. 2 is a block diagram showing a specific arrangement of a data converting section as shown in FIG. 1.

Referring to FIG. 2, a specific construction of the data converting section 9 is shown. As shown, the data converting section 9 includes a format converting subsection 10 to which a data signal from the CG and printer controller 2 is applied. Connected to the format converting subsection 10 are a dot data reference shift register group 12 and a line store shift register group 14. The line store shift register group 14 is made up of three shift registers 14 (1) to 14 (3) which are adapted to check nearby dots and history. The (n−1) line store shift register 14 (1) is assigned to data positioned one line before, the (n=2) line store shift register 14 (2) to data positioned two lines before, and the (n−3) line store shift register 14 (3) to data positioned three lines before. On the other hand, the dot data reference shift register 12 is made up of four shift registers 12 (1) to 12 (4). In FIG. 2, X designates dot data being observed, D and E designate dot data next to the dot data X, A designates dot data positioned one line before the data X, F and G designate dot data next to the data A, B designates dot data positioned two lines before the data X, and C designates dot data positioned three lines before the data X.

The output of the format converting subsection 10 is routed sequentially through the dot data reference shift register 12 (1) and (n−1) line store shift register 14 (1), the dot data reference shift register 12 (2) and (n−2) line store shift register 14 (2), the dot data reference shift register 12 (3) and (n−3) line store shift register 14 (3), and the dot data reference shift register 12 (4) in this order. The data A, B, C, D, E, F and G lodged in the dot data reference shift registers 12 (1) to 12 (4) are fed by twelve output lines to a gate circuit 16 which is made up of fourteen AND gates 16 (1) to 16 (15). The output signal of the gate circuit 16 is routed to a conversion ROM 18 together with the data X which is stored in the dot data reference shift register 12 (1).

The conversion ROM 18 stores a ROM table in which numerical values of energy to be applied in relation to surrounding dot data and others are tabulated. Specifically, the conversion ROM 18 performs conversion processing on the dot being observed by referencing surrounding dot data and writes the result in a quadripartite line buffer 20. The line buffer 20 comprises four line buffers 20 (1) to 20 (4) each of which in turn comprises two line buffers a and b. Specifically, as soon as one line of data are lodged in the line buffer a, the next one line of data begin to be stored in the line buffer b. The outputs of the line buffers 20 (1) to 20 (4) are routed through a pulse width converting subsection 22 to an odd-even distributing subsection 24 and, therefrom, to a driver for driving the thermal head 6.

Specifically, as the line buffer a of any of the line buffers 20 (1) to 20 (4) becomes full, the data stored in the line buffer a are decoded by the pulse width converting subsection 22 and, then, separated into odd dot data and even dot data by the odd-even distributing subsection 24. The odd and the even data are delivered one at a time to the driver for the thermal head 6 under the control of a signal which is fed from the system controller 3. The reference numeral 26 designates a control signal generator for applying a control signal to the system controller 3. A character signal output by the CG and printer controller 2 is fed to the AND gates 16 (1) to 16 (15) of the gate circuit 16.

Figure 3:
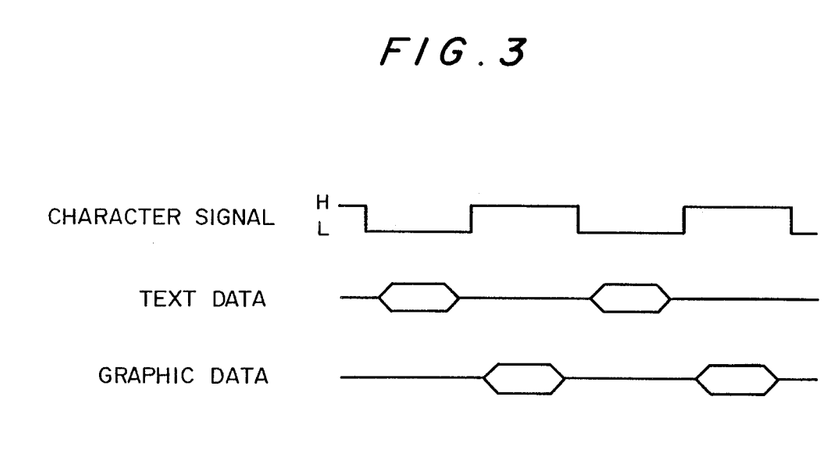
FIG. 3 is a timing chart representative of a relationship between a character signal, graphic data, and text data.

In the above construction, as shown in FIG. 3, the character signal from the CG and printer controller 2 becomes (logical) high level (H) when graphic data is to be printed out, and becomes (logical) low level (L) when text data is to be printed out. When data to be printed out is the graphic data, the character signal which is H enables the AND gates 16 (1) to 16 (15) of the gate circuit 16 which then wait for the data A, B, C, D, E, F and G from the dot data reference shift register group 12 and, therefore, those data A to G become valid. Specifically, the dot data D and E next to the dot data X being observed, the dot data A one line before the dot data X, the dot data F and G next to the dot data A, the dot data B two lines before the dot data X, and the dot data C three lines before the dot data X are fed to the conversion ROM 18. The output data of the conversion ROM 18 which have been converted by those surrounding dot data are loaded in the quadripartite line buffer 20. When the line buffer a of any of the line buffers 20 (1) to 20 (4) has been filled with line data, the line data are decoded by the pulse width converting subsection 22, then separated into odd data and even data by the odd-even distributing subsection 24, and then fed to the thermal head by the output signal of the system controller 3 to be printed out.

When data to be printed out is the text data, or character data, the character signal fed from the CG and printer controller 2 to the data converting subsection 9 becomes L. Subsequently, a data signal, or text data, is applied to the format converting subsection 10. In this instance, all of the gates 16 (1) to 16 (15) of the gate circuit 16 are disabled by the character signal. As a result, whatever the states of the data A, B, C, D, E, F and G stored in the dot data reference shift register group 12 may be, they are regarded to be ZEROs; only the dot data X being observed is fed to the conversion ROM 18. The ROM 18, therefore, selects energy of the maximum value as in the case wherein input data has no history and others. That is, the data is printed out by great energy, in contrast to graphic data which is effected by history and others as previously stated. The processing by the ROM 18 is followed by processing which is similar to a one adapted to print out usual graphic data. In this manner, for text data, the heating elements associated with that data are supplied with sufficient energy without being effected by surrounding dot data and history data, preventing a character from appearing thin when printed out.

As stated above, when text data is to be printed, a greater amount of energy is applied to heating elements than when graphic data is to be printed out. This protects text data against thinning when printed out even if the text data coexist with graphic data, thereby promoting high quality printout of a mixture of pictures and characters.

Figure 4:
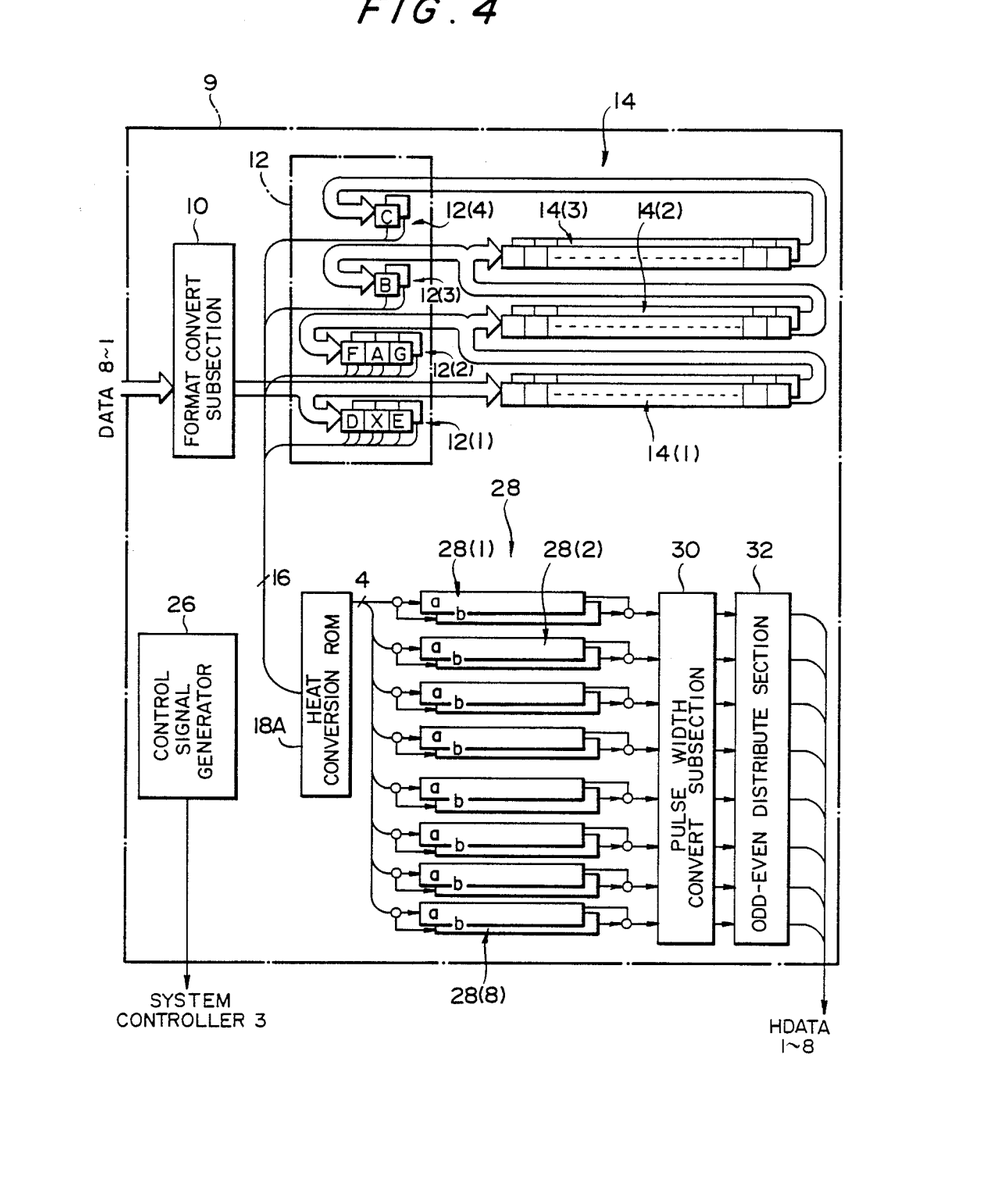
FIG. 4 is a block diagram showing another specific arrangement of the data converting section of FIG. 1.

Referring to FIG. 4, another specific construction of the data converting section 9 of FIG. 1 is shown. In FIG. 4, the same or similar structural elements as those shown in FIG. 2 are designated by like reference numerals.

As shown in FIG. 4, a heat conversion ROM 18A is connected to the dot data reference shift register 12 while an octamerous line buffer 28 is connected to the heat conversion ROM 18A. The line buffer 28 comprises eight line buffers 28 (1) to 28 (8) each of which in turn comprises line buffers a and b, as has been the case with the line buffer 20 of FIG. 2. A pulse width converting subsection 30 is connected to the line buffers 28 (1) to 28 (8) and to an odd-even distributing subsection 32. This subsection 32 is connected to the driver for the thermal head 6.

Figure 5:
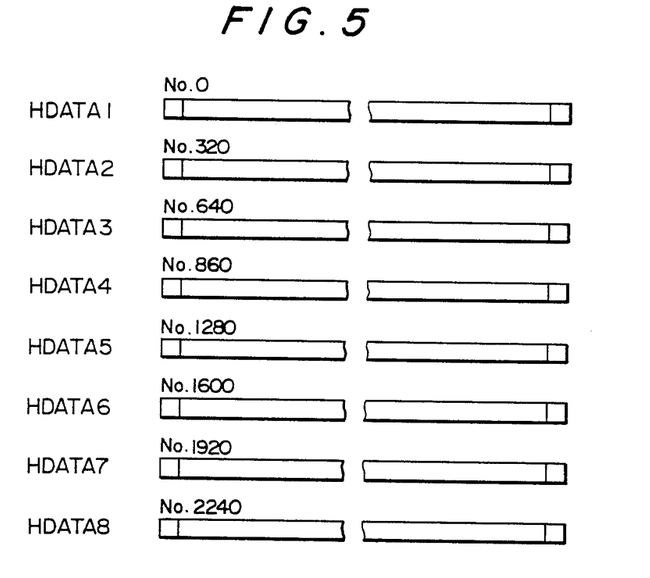
FIG. 5 is a view showing a storing sequence of an octamerous line buffer which is included in the data converting section of FIG. 4.

In operation, when graphic data is to be printed out, the character signal from the CG and printer controller 2 is H. Under this condition, the data A, B, C, D, E, F and G stored in the shift register group 12 are valid. Hence, the dot data D and E next to the dot data X being observed, the dot data A one line before the dot data A, the dot data F and G next to the dot data A, the dot data B two lines before the dot data X, and the dot data C three lines before the dot data X are applied to the heat conversion ROM 18A. The dot data X being observed is converted by referencing the surrounding dot data entered so and, then, stored in the octamerous line buffer 28. Such a storing sequence is shown in FIG. 5. Specifically, FIG. 5 shows the construction of octameous data. It is to be noted that the numbers (Nos.) shown in FIG. 5 apply to a 2560-dot thermal head.

Figure 6:
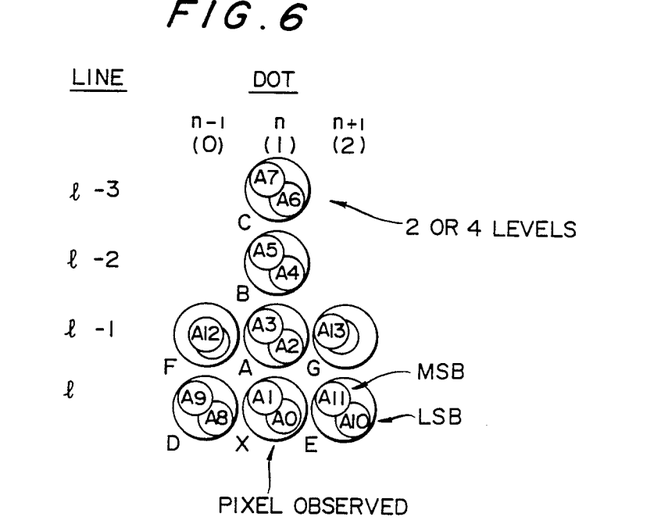
FIG. 6 is a view showing a manner of referencing dots on an actual print surface.
Figure 7:
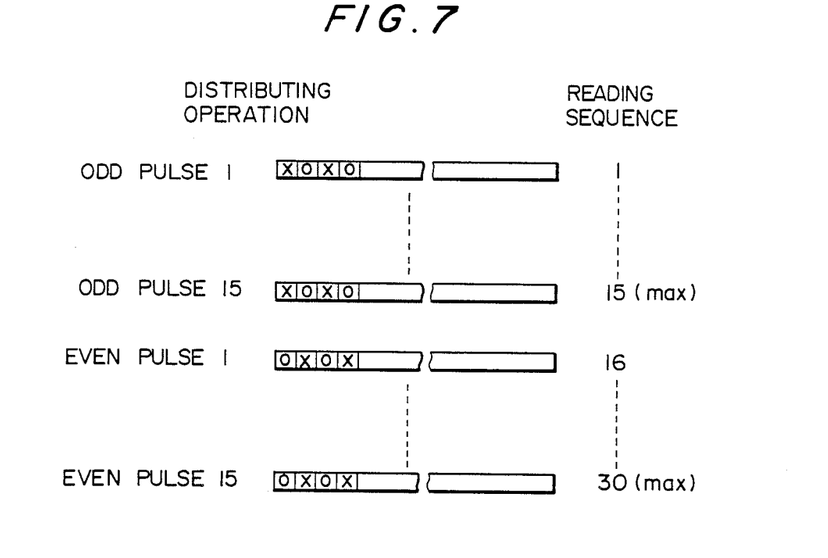
FIG. 7 is a diagram showing a manner of distributing odd data and even data.

FIG. 6 shows a manner of referencing dots on an actual print surface. In FIG. 6, A, B, C, D, E, F and G correspond, respectively, to the data A, B, C, D, E, F and G stored in the shift register group 12 of FIG. 2. As shown in FIG. 7, odd dot data and even dot data are separated by an odd-even distributing subsection 32 to be selectively fed to the thermal head 6.

Figure 8:
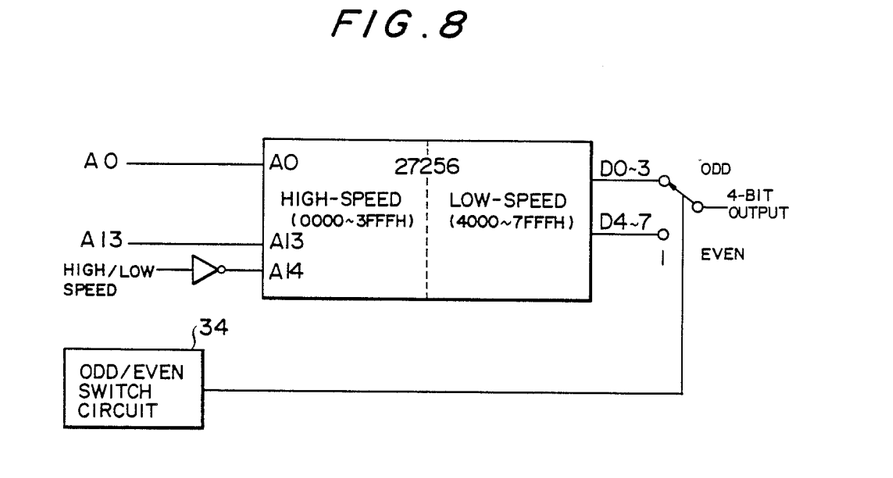
FIG. 8 is a diagram useful for explaining an address decoding method associated with a heat conversion read only memory (ROM)

Further, FIG. 8 shows an address decoding method which is associated with the heat conversion ROM 18A. Specifically, upper four bits of the ROM 18A store conversion values which correspond to a case wherein the dot X being observed is even, and lower four bits store conversion values which correspond to a case wherein the dot X is odd. An odd/even switching circuit 34 is provided for causing data to be read out of the ROM 18A on an odd-even basis also.

Figure 9:
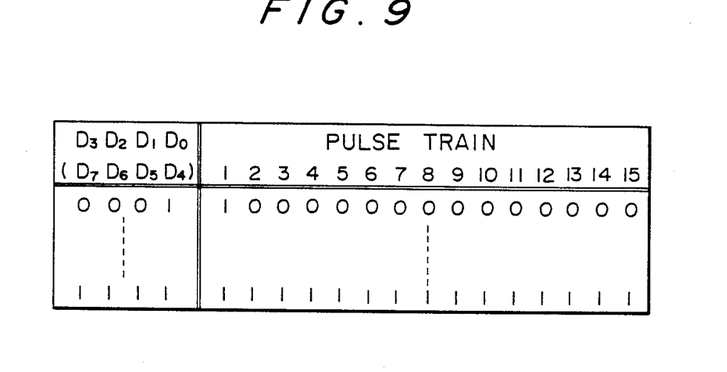
FIG. 9 is a diagram useful for explaining a data decoding method associated with a pulse width converting subsection.
Figure 10:
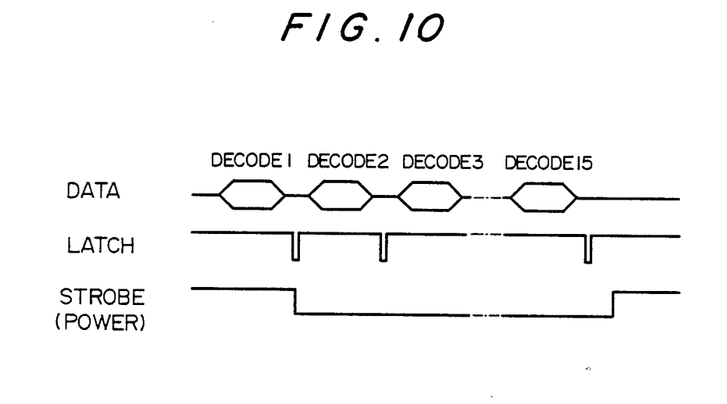
FIG. 10 is a timing chart showing the timing of data decoding and that of power supply to a thermal head.

The data decoding method for the pulse width converting subsection 30 is shown in FIG. 9. The decoding timing associated with this subsection 30 and the power supply timing to the thermal head 6 are shown in FIG. 10.

As described above, this particular embodiment of FIG. 4 is capable of reproducing adequate density and, yet, maintaining the dot area constant.

Various modifications will become possible for those skilled in the art after receiving the teachings of the present disclosure without departing from the scope thereof.

What is claimed is:

1. A thermal printer comprising:
   a thermal head having a number of heating elements arranged in an array at a predetermined pitch;
   data converting means for correcting data fed from a host to an adequate value responsive to heat accumulation information;
   deciding means for deciding whether said data fed from said host is graphic data or character data;
   disabling means for disabling said data converting means when said data is character data as decided by said deciding means; and
   a system controller for performing sequence control over the entirety of said thermal printer inclusive of said data converting means, said disabling means, and said deciding means.

2. A thermal printer as in claim 1 in which said converting means comprises means for correcting said data fed from a host to a value which for an observed printing dot X in line (n) is a function of the printing history for dots A-G, where dot A is in line (n-1) and directly over dot X, dot B is in line (n-2) and directly over dot A, dot C is in line (n-3) and directly over dot B, dots D and E are in line (n) and immediately flank dot X, and dots F and G are in line (n-1) and immediately flank dot A.

3. A thermal printer comprising a thermal print head which has a plurality of heat producing elements which can be selectively driven to thermally form an image on a recording medium, and a host supplying printing data to said thermal print head which can be graphic data for printing graphics or character data for printing characters, said data comprising data for printing lines of dots and said printer further comprising:
   correcting means responsive to the printing data for an observed dot to generate a signal for driving the print head to print said observed dot, wherein said driving signal is a function of not only of the printing data for the observed dot but also of printing data for selected dots from at least two prior printing lines;
   detecting means which detect if said printing data supplied to the thermal head from the host are graphic data or character data;
   control means responsive to the detection of graphic data by said detecting to enable said correcting to make the driving signal for each observed dot a function of the printing data for said selected other dots but responsive to the detection of character data by said detecting means to disable said correcting means and thereby prevent the driving signal for the observed dot from being said function of the printing data for said other dots.

4. A thermal printer as in claim 3 in which said converting means comprises means for generating a driving signal for the observed dot which is a function of printing data for the observed dot X on printing line (n) as well as of printing data for dots A-G, where dot A is in line (n-1) and is aligned with dot X, dot B is in line (n-2) and is aligned dot A, dot C is in line (n-3) and is aligned with dot B, dots D and E are in line (n) and flank dot X, and dots F and G are in line (n-1) and flank dot A.

* * * * *